United States Patent
Shen

(10) Patent No.: US 10,473,975 B2
(45) Date of Patent: Nov. 12, 2019

(54) ADHESIVE TAPE, BACKLIGHT UNIT AND DISPLAY DEVICE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventor: Kejun Shen, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

(*) Notice: Subject to any disclaimer, the term of this patent is extended or adjusted under 35 U.S.C. 154(b) by 380 days.

(21) Appl. No.: 15/325,880

(22) PCT Filed: Jun. 27, 2016

(86) PCT No.: PCT/CN2016/087277
§ 371 (c)(1),
(2) Date: Jan. 12, 2017

(87) PCT Pub. No.: WO2017/117921
PCT Pub. Date: Jul. 13, 2017

(65) Prior Publication Data
US 2018/0210289 A1 Jul. 26, 2018

(30) Foreign Application Priority Data
Jan. 4, 2016 (CN) .................. 2016 2 0005747 U

(51) Int. Cl.
*F21V 8/00* (2006.01)
*G02F 1/1333* (2006.01)
*G02F 1/1335* (2006.01)

(52) U.S. Cl.
CPC ..... *G02F 1/133604* (2013.01); *G02B 6/0083* (2013.01); *G02B 6/0091* (2013.01); *G02F 1/133308* (2013.01); *G02F 2001/133314* (2013.01); *G02F 2001/133317* (2013.01); *G02F 2202/28* (2013.01)

(58) Field of Classification Search
CPC ......... G02F 1/133604; G02F 1/133308; G02B 6/0083; G02B 6/0091
See application file for complete search history.

(56) References Cited

U.S. PATENT DOCUMENTS

2015/0323827 A1* 11/2015 Di .................. G02F 1/133308
362/97.2
2016/0291361 A1* 10/2016 Fu .................. G02F 1/133308

FOREIGN PATENT DOCUMENTS

| CN | 1619385 A | 5/2005 |
|---|---|---|
| CN | 1963622 A | 5/2007 |
| CN | 101476689 A | 7/2009 |
| CN | 101840091 A | 9/2010 |

(Continued)

OTHER PUBLICATIONS

International Search Report and Written Opinion dated Aug. 29, 2016; Appln. PCT/CN2016/087277.

*Primary Examiner* — Thomas M Sember

(57) ABSTRACT

An adhesive tape, a backlight unit and a display device are provided. The adhesive tape (1) includes a plurality of nonlinear gaps (100) that separate the adhesive tape (1) into a plurality of adhesive tape bodies (11, 12, 2, 3, 2', 3', 31', 33'). The backlight unit includes the adhesive tape for blocking light.

15 Claims, 5 Drawing Sheets

(56) References Cited

FOREIGN PATENT DOCUMENTS

| | | |
|---|---|---|
| CN | 102610173 A | 7/2012 |
| CN | 202708965 A | 1/2013 |
| CN | 203811936 U | 9/2014 |
| CN | 204162647 U | 2/2015 |
| CN | 205334014 U | 6/2016 |
| JP | 2015-090816 A | 5/2015 |
| KR | 20120001073 A | 1/2012 |

* cited by examiner

ADHESIVE TAPE, BACKLIGHT UNIT AND DISPLAY DEVICE

TECHNICAL FIELD

Embodiments of the present disclosure relate to an adhesive tape, a backlight unit and a display device.

BACKGROUND

Liquid crystal display device is a display device with a backlight unit as light source and a liquid crystal display panel as display device. The light emission effect of the backlight unit may directly influence the visual effect of the liquid crystal display panel. Therefore, in order to improve the light emission effect of the backlight unit, a adhesive tape is disposed at the edge of a surface of the backlight unit that contacts the liquid crystal display panel to avoid the problem of poor light emission effect of the liquid crystal display device due to light leak from the gap between the backlight unit and the liquid crystal display panel.

Presently, the adhesive tape is generally a frame-like continuous closed structure. In manufacturing, the middle of an entire piece of light-blocking material needs to be hollowed out to form an adhesive tape with frame-like continuous closed structure in the entire piece of light-blocking material, and the hollowed out part of the light-blocking material will become waste due to the wrong size, thereby causing material waste and resulting in increased manufacturing cost of the adhesive tape. In addition, since the adhesive tape is a frame-like continuous closed structure, when the backlight unit is subjected to a test of high temperature high wetness reliability and the backlight unit spreads or shrinks due to the temperature change, the adhesive tape will experience deformation as a whole, which degrades the light blocking of the adhesive tape and drastically impacts the light emission effect of the backlight unit.

SUMMARY

Embodiments of the present disclosure provide an adhesive tape, a backlight unit and a display device According to at least one embodiment, an adhesive tape is provided. The adhesive tape includes a plurality of nonlinear gaps that separate the adhesive tape into a plurality of adhesive tape bodies.

In an example, the nonlinear gaps have a shape including L, Z or S shape.

In an example, the nonlinear gaps are arranged at corners of the adhesive tape or on sides of the adhesive tape; and each nonlinear gap includes a section of a first adhesive tape body and a section of a second adhesive tape body.

In an example, the nonlinear gap is Z-shaped, the section of the first adhesive tape body is a Z-shaped structure including a first plane, a second plane and a third plane connected in turn, the section of the second adhesive tape body is a Z-shaped structure including a fourth plane, a fifth plane and a sixth plane connected in turn.

The nonlinear gaps are provided at corners of the adhesive tape, the second adhesive tape body has a width greater than a width of the first adhesive tape body, and the sixth plane is connected with a seventh plane provided perpendicularly to the sixth plane; the first plane and the fourth plane form a first vertical spacing as a light outlet, the second plane and the fifth plane form a first horizontal spacing, the third plane and the sixth plane form a second vertical spacing, the first vertical spacing, the first horizontal spacing and the second vertical spacing are connected in turn to form a Z-shaped nonlinear gap, and the seventh plane and a side on which a long edge of the first adhesive tape body is located form a second horizontal spacing as a light inlet.

The nonlinear gaps are provided on sides of the adhesive tape, the first plane and the fourth plane form a first horizontal spacing as a light outlet, the second plane and the fifth plane form a vertical spacing, the third plane and the sixth plane form a second horizontal spacing as a light inlet, and the first horizontal spacing, the vertical spacing and the second horizontal spacing are connected in turn to form the Z-shaped nonlinear gaps.

In an example, the nonlinear gaps are arranged at corners of the adhesive tape or on sides of the adhesive tape In an example, a contour of the adhesive tape is a frame-like contour formed by a plurality of adhesive tape bodies.

In an example, the adhesive tape bodies are linear adhesive tape bodies or nonlinear adhesive tape bodies; and if a shape of the adhesive tape body is nonlinear, the adhesive tape body includes a wide edge section and a narrow edge section connected with the wide edge section, or the adhesive tape body includes two connected narrow edge sections.

In an example, each of the adhesive tape bodies includes several adhesive strips that can block light with spacing between adjacent adhesive strips.

In an example, the adhesive tape may be applied to a display device and match an edge contour of a backlight unit in the display device.

In an example, the nonlinear gap is L-shaped, a section of the first adhesive tape body is a first plane, a section of the second adhesive tape body is an L-shaped structure including a second plane and a third plane connected in turn.

The nonlinear gaps are provided at corners of the adhesive tape, the first plane and the second plane form a vertical spacing as a light outlet, the third plane and a side on which a long edge of the second adhesive tape body is located form a horizontal spacing as a light inlet, and the vertical spacing and the horizontal spacing form an L-shaped nonlinear gap.

The nonlinear gaps are provided on sides of the adhesive tape, the second plane and a side on which a long edge of the first adhesive tape body is located form a vertical spacing as a light outlet, the third plane and the first plane form a horizontal spacing as a light inlet, and the horizontal spacing and the vertical spacing form an L-shaped nonlinear gap.

In an example, the nonlinear gap is S-shaped, a section of the first adhesive tape body is a first S-shaped curved surface, a section of the second adhesive tape body is a second S-shaped curved surface, the first S-shaped curved surface and the second S-shaped curved surface abut each other with a spacing to form a S-shaped nonlinear gap.

Embodiments of the present disclosure also provide a backlight unit including the adhesive tape.

Embodiments of the present disclosure also provide a display device, including the backlight unit.

BRIEF DESCRIPTION OF THE DRAWINGS

Embodiments of the present disclosure will be described in detail hereinafter in conjunction with accompanying drawings to allow one of ordinary skill in the art to understand the present disclosure more clearly, in which.

DETAILED DESCRIPTION

Figure 1:
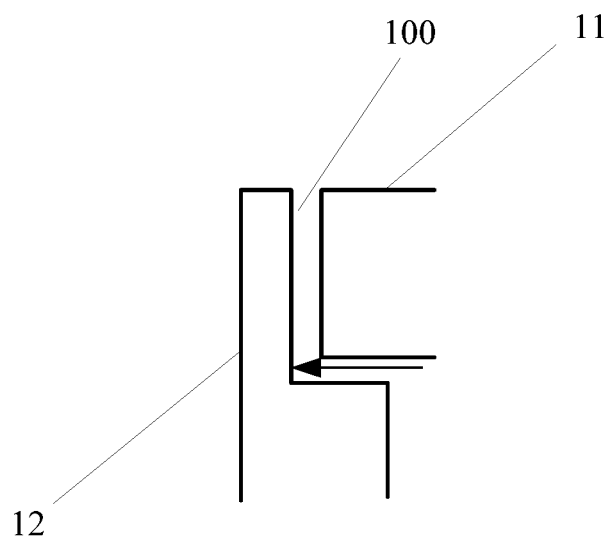
FIG. 1 is a structure diagram of an L-shaped nonlinear gap disposed at a corner of the adhesive tape in an embodiment of the present disclosure.

Technical solutions of the embodiments will be described in a clearly and fully understandable way connected with the drawings related to the embodiments of the disclosure. It is apparent that the described embodiments are just a part but not all of the embodiments of the disclosure. Based on the described embodiments herein, those skilled in the art can obtain other embodiment(s), without ally inventive work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," or the like, are not limited to a physical connection or mechanical connection, but may include an electrical connection/coupling, directly or indirectly. The terms, "on," "under," or the like are only used to indicate relative position relationship, and if the position of the object which is described is changed, the relative position relationship may be changed accordingly.

To further explain the adhesive tape, the backlight unit and the display device provided in embodiments of the present disclosure, they will be described in detail below with reference to accompanying drawings.

Referring to FIGS. 1-9, the adhesive tape 1 in an embodiment of the present disclosure is provided with a plurality of nonlinear gaps or breaks 100 that separate the adhesive tape 1 into a plurality of adhesive tape bodies.

The adhesive tape of the embodiment of the present disclosure may be applied to a display device which can reduce light emitted from the edge of the backlight unit of the display device and prevent light leakage.

For example, light emitted by the backlight unit cannot pass in straight line at nonlinear gaps or breaks 100. At the adhesive tape bodies, the bodies block light emitted from the backlight unit, which avoids leakage of light emitted by the backlight unit at the gap between the backlight unit and the liquid crystal display panel.

In the above-mentioned example, the adhesive tape 1 in the embodiment of the present disclosure is provided with a plurality of nonlinear gaps 100. When light emitted by the backlight unit leaks outward from the gap between the backlight unit and the liquid crystal display panel, the nonlinear gaps 100 prevent light emitted by the backlight unit from leaking out from the nonlinear gaps by their characteristics of preventing rectilinear propagation of light. Although a plurality of nonlinear gaps 100 are provided on the adhesive tape 1 in the embodiment of the present disclosure, however, light emitted by the backlight unit cannot leak out from the nonlinear gaps 100, the adhesive tape provided in the embodiment of the present disclosure still has good performance of blocking light, which can prevent light emitted by the backlight unit from leaking outward from the gap between the backlight unit and the liquid crystal display panel. A plurality of nonlinear gaps 100 separate the adhesive tape 1 into a plurality of light-blocking adhesive tape bodies, the adhesive tape of the embodiment of the present disclosure may be prepared by splicing up, which avoids material waste due to the useless hollowed out part by hollowing out the central part of the entire piece of light-blocking material.

In addition, the adhesive tape provided in the embodiment of the present disclosure is provided with a plurality of nonlinear gaps 100. When a film material in a backlight unit with this structure is subjected to a test of high temperature high humidity reliability, nonlinear gaps 100 on the adhesive tape 1 provide channels for air discharge from the film material in the backlight unit to allow the film material in the backlight unit to discharge air effectively. Furthermore, the plurality of nonlinear gaps 100 separate the adhesive tape 1 into a plurality of light-blocking adhesive tape bodies, each tape body can expand or shrink accordingly as the backlight unit expands or shrinks due to temperature change without affecting other bodies, which allows a good light blocking effect of the adhesive tape 1 and enhancing the light emission effect of the backlight unit.

It is noted that the adhesive tape 1 matches the edge contour of the backlight unit ill the display device to further block light leakage between the backlight unit and the display panel.

It is noted that the nonlinear gaps 100 may be provided on a side or a corner of the adhesive tape 1 and each nonlinear gap 100 is formed of sections of two adhesive tape bodies. FIGS. 1-6 show three optional shapes of the nonlinear gaps 100, which are L-shape, Z-shape or S-shape, respectively. However, the embodiments of the present disclosure are not limited thereto. For example, the nonlinear gaps 100 may also be any other shapes which can block light emitted by the backlight unit from leaking out.

Corresponding locations of the nonlinear gaps 100 and the adhesive tape bodies in a frame-like structure will be described below with reference to FIGS. 1-6. As an example, a rectangular frame will be described.

Figure 2:
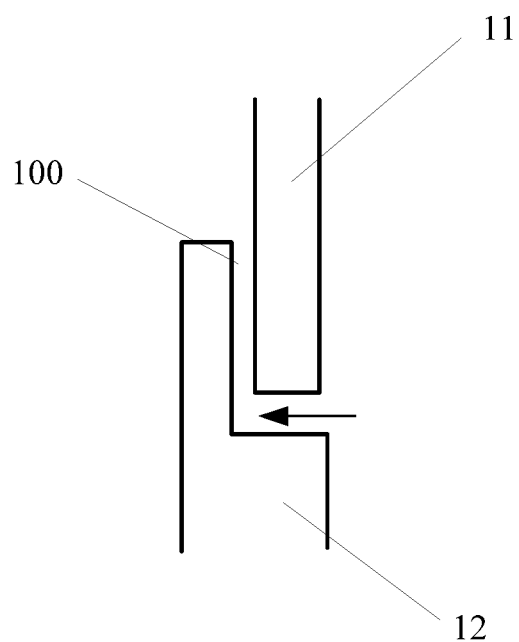
FIG. 2 is a structure diagram of an L-shaped nonlinear gap disposed at a side of the adhesive tape in an embodiment of the present disclosure.

I. The nonlinear gaps 100 shown in FIGS. 1 and 2 are L shaped. It is noted that the adhesive tape has a certain thickness and a respective gap includes a section (perpendicular to the bonding surface of the adhesive tape), which may be understood as perpendicular to the paper as a reference. In the present embodiment, the nonlinear gap 100 includes a section of the first adhesive tape body 11 and a section of the second adhesive tape body 12. The section of the first adhesive tape body 11 is defined as a first plane while the section of the second adhesive tape body 12 is defined as an L-shaped structure including the second and third planes, in which the first plane is located in a region formed by the second and third planes.

As shown in FIG. 1, in an instance that nonlinear gaps are L shaped, and provided at corners of the adhesive tape 1, the first and second planes form a vertical spacing as a light outlet, sides where long edges of the third plane and the second adhesive tape bodies 12 are located on form a horizontal spacing as a light inlet, and the vertical spacing and the horizontal spacing form a L-shaped nonlinear gap 100. The first plane and the second plane abut each other, the first plane is formed in the width direction of the first adhesive tape body 11 and the second plane is formed in the length direction of the second adhesive tape body 12, the width of the first adhesive tape body 11 is constrained by the length of the second adhesive tape body 12 but not constrained by the width of the second adhesive tape body. To reduce the complexity of preparing the adhesive tape 1, it is possible to cut an adhesive tape with uniform width into the first adhesive tape body 11 and the second adhesive tape body 12, which facilitates manufacturing of the first adhesive tape body 11 and the second adhesive tape body 12.

In addition, in an instance that the nonlinear gaps are provided at corners of the adhesive tape 1, light (in the direction of arrow shown in FIG. 1) leaks outward along the horizontal spacing in the nonlinear gap 100 and would be blocked by the second plane in the second adhesive tape body 12 and cannot propagate in a straight line. In this way, light leakage is reduced or even avoided. Reducing or avoiding light leakage is dependent on the angle of incidence of the light with respect to the second plane. Ideally, when the light is incident onto the second plane at an angle of 0°, it can be returned completely, which can completely avoid light leakage. To avoid light leakage, it is possible to reduce the distance between the side of the first adhesive tape body 11 and the third plane as much as possible to adjust the angle of incidence of light to the second plane to approach 0° as far as possible.

As shown in FIG. 2, in an instance that nonlinear gaps are L shaped, and provided at sides of the adhesive tape 1, the second plane and the side where long edge of the first adhesive tape bodies 11 is located on form a vertical spacing as a light outlet, the third and first planes form a horizontal spacing as a light inlet, and the horizontal spacing and the vertical spacing form a L-shaped nonlinear gap 100. The first plane and the third plane abut each other, the first plane is formed in the width direction of the first adhesive tape body 11 and the third plane is formed in the width direction of the second adhesive tape body 12, so that the width of the first adhesive tape body 11 is constrained by the width of the second adhesive tape body 12. In other words, the width of the first adhesive tape body 11 and the width of the second adhesive tape body 12 are different. In manufacturing the light-blocking adhesive tape 1, when cutting the first adhesive tape body 11 and the second adhesive tape body 12, they need to be cut from adhesive tapes with different widths, which increase the complexity of manufacturing the adhesive tape 1. It is possible to cut out the first adhesive tape body 11 and the second adhesive tape body 12 from an adhesive tape with the same width, which facilitates the preparing of the first and second adhesive tape bodies 11 and 12.

In addition, in an instance that the nonlinear gaps are provided at sides of the adhesive tape 1, light (in the direction of arrow shown in FIG. 2) leaks outward along the nonlinear gap 100 and would be blocked by the second plane in the second adhesive tape body 12 and cannot propagate in a straight line, which can reduce or avoid light leakage. Reducing or avoiding light leakage is depended on the angle of incidence of light onto the second plane. In perfect conditions, when light is incident onto the second plane at an angle of 0°, it can be completely returned and then it is possible to completely avoid light leakage. To avoid light leakage, it is possible to reduce the distance between the third plane and the first plane as much as possible to adjust the angle of incidence of light with respect to the L-shaped plane to allow it to approach 0° as far as possible.

Figure 3:
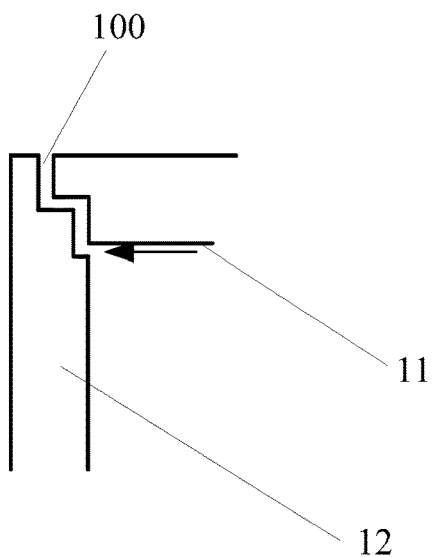
FIG. 3 is a structure diagram of a Z-shaped nonlinear gap disposed at a corner of the adhesive tape in an embodiment of the present disclosure.
Figure 4:
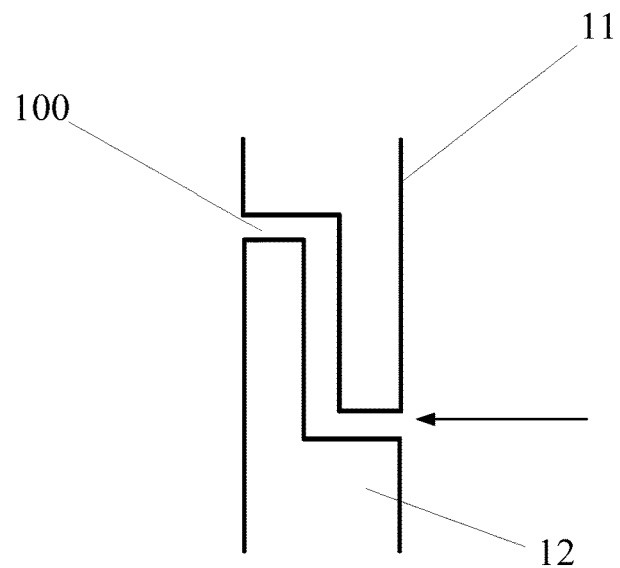
FIG. 4 is a structure diagram of a Z-shaped nonlinear gap disposed at a side of the adhesive tape in an embodiment of the present disclosure.

II. The nonlinear gaps 100 shown in FIGS. 3 and 4 are Z shaped and may be disposed at corners or sides of the light-blocking adhesive tape 1. The nonlinear gap 100 includes a section of the first adhesive tape body 11 and a section of the second adhesive tape body 12. The section of the first adhesive tape body 11 is defined as a Z-shaped structure including a first, second and third planes connected in turn. The section of the second adhesive tape body 12 is defined as a Z-shaped structure including a fourth, fifth and sixth planes connected in turn.

As shown in FIG. 3, in an instance that nonlinear gaps 100 are Z shaped, and provided at corners of the adhesive tape 1, the first and fourth planes form a vertical spacing as a light outlet, the second and fifth planes form a first horizontal spacing, the third and sixth planes form a second vertical spacing, and the first vertical spacing, the first horizontal spacing and the second vertical spacing are connected in turn to form the Z-shaped nonlinear gap.

In an instance that the nonlinear gaps 100 are provided at sides of the adhesive tape 1, light (in the direction of arrow shown in FIG. 3) leaks outward along the nonlinear gap 100 and would be blocked by the sixth plane in the second adhesive tape body 12 and cannot propagate in a straight line, which can reduce or avoid light leakage. Reducing or avoiding light leakage is dependent of the angle of incidence of light onto the sixth plane. In perfect conditions, when light is incident onto the sixth plane at an angle of 0°, it can be completely returned and then it is possible to completely avoid light leakage. In order to adjust the angle of incidence of light onto the sixth plane to 0°, it is possible to connect the seventh plane to the sixth plane, which forms the second horizontal spacing as a light inlet with a side on which the long edge of the first adhesive tape body 11 is located; then the distance between the seventh plane and the long edge of the first adhesive tape body is adjusted to adjust the width of the horizontal spacing, thereby it's possible to adjust the angle of incidence of light with respect to the sixth plane to approach 0° as far as possible, and light leakage is reduced.

As shown in FIG. 4, in an instance that nonlinear gaps 100 are Z shaped, and provided on sides of the adhesive tape 1, the first and fourth planes form a first horizontal spacing as a light outlet, the second and fifth planes form a vertical spacing, the third and sixth planes form a second horizontal spacing as a light inlet, and the first horizontal spacing, the vertical spacing and the second horizontal spacing are connected in turn to form the Z-shaped nonlinear gap.

In an instance that the nonlinear gaps 100 are provided at sides of the adhesive tape 1, light (in the direction of arrow shown in FIG. 4) leaks outward along the nonlinear gap 100 and would be blocked by the sixth plane in the second adhesive tape body 12 and cannot propagate in a straight line, which can reduce or avoid light leakage. The reducing or avoiding light leakage is depended on the angle of incidence of light onto the fifth plane. In perfect conditions, when light is incident onto the fifth plane at an angle of 0°, it can be completely returned and then it is possible to completely avoid light leakage. In order to avoid light leakage, it is possible to reduce the distance between the sixth plane and the third plane as much as possible to reduce the width of the second horizontal spacing, thereby adjusting the angle of incidence of light with respect to the sixth plane to approach 0° as far as possible.

As can be seen from the above-mentioned analysis, in an instance that nonlinear gaps are provided at corners of the light-blocking adhesive tape 1, the section structure of the second adhesive tape body 12 is complex. In this way, it is possible to set the width of the second adhesive tape body to be greater than that of the first adhesive tape body.

Figure 5:
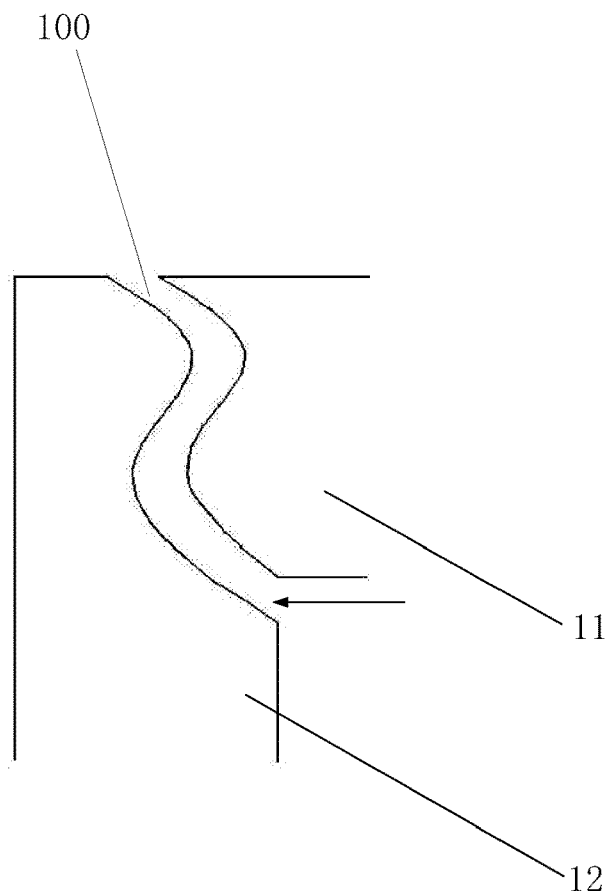
FIG. 5 is a structure diagram of a S-shaped nonlinear gap disposed at a corner of the adhesive tape in an embodiment of the present disclosure.
Figure 6:
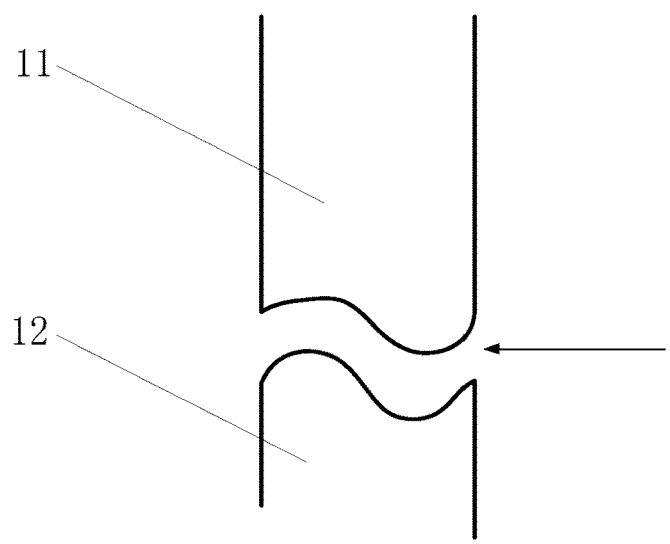
FIG. 6 is a structure diagram of a S-shaped nonlinear gap disposed at a side of the adhesive tape in an embodiment of the present disclosure.

III. The nonlinear gaps 100 shown in FIGS. 5 and 6 are S shaped and may be disposed at corners or sides of the adhesive tape 1. The nonlinear gap 100 includes a section of the first adhesive tape body 11 and a section of the second adhesive tape body 12. The section of the first adhesive tape body 11 is defined as a first S-shaped curved surface, the section of the second adhesive tape body 12 is defined as a second S-shaped curved surface, and the first S-shaped curved surface and the second S-shaped curved surface abut each other with a spacing to form the S-shaped nonlinear gap.

As can be Seen from the structure of the nonlinear gap 100 shown in FIGS. 5 and 6, light (in the directions of arrows shown in FIGS. 5 and 6) leaks outward along the nonlinear gap 100 and would be blocked by the first S-shaped curved surface on the second adhesive tape body 12 or the second S-shaped curved surface on the second adhesive tape body and cannot propagate in a straight line, which can reduce or avoid light leakage. The reducing or avoiding light leakage is depended on the angle of incidence of light onto the first or second S-shaped curved surface. In perfect conditions, when light is incident onto the first or second S-shaped curved surface at an angle of 0°, it can be completely returned and then it is possible to completely avoid light leakage. To adjust the angle of incidence of light incident onto the first or second S-shaped curved surface as 0°, it is possible to modify the curvature of the first or second S-shaped curved surface to adjust the first or second S-shaped curved surface, which can allow the angle of light incident onto the first or second S-shaped curved surface to approach 0° as far as possible, thereby reducing light leakage.

It is noted that the adhesive tape 1 may be various structures that can prevent light emitted by the backlight unit from leaking from the gap between the backlight unit and the liquid crystal display panel. If the parts to be shielded from light are abnormal shaped, the corresponding adhesive tape bodies and gaps between adhesive tape bodies may form shapes corresponding to the shapes of parts to be shielded from light. For example, they may be circle, trapezoid or other abnormal shape structures. In addition, the sections of the first adhesive tape body 11 and the sections of the second adhesive tape body 12 shown in the above FIGS. 1-6 are perpendicular to the paper.

There may be various kinds of adhesive tape bodies that constitute the adhesive tape 1, which is generally depended on the overall structure of the adhesive tape. For example, they may be classified into linear adhesive tape bodies or non-linear adhesive tape bodies. Furthermore, a nonlinear adhesive tape body may include two connected narrow edge sections, and may also include a wide edge section and a narrow section connected with the wide edge section.

The effect of the locations and the number of nonlinear gaps 100 on the type of adhesive tape bodies will be described below with respect to an adhesive tape 1 of a frame-like structure.

Figure 7:
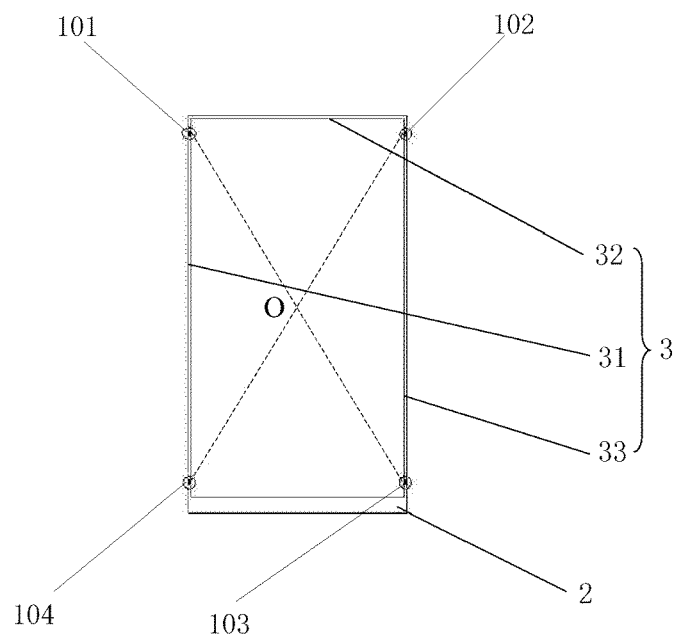
FIG. 7 is a schematic location diagram of four nonlinear gaps disposed on a side of the adhesive tape in an embodiment of the present disclosure.

As shown in FIG. 7, in an instance that the nonlinear gaps 100 are disposed on sides of the adhesive tape 1, the adhesive tape 1 has a frame-like structure enclosed by four adhesive tape bodies, namely the first linear adhesive tape body 31, the first U-shaped adhesive tape body 32, the second linear adhesive tape body 33 and the second U-shaped adhesive tape body 2. The first U-shaped adhesive tape body 32 and the second U-shaped adhesive tape body 2 are both one of nonlinear adhesive tape bodies. The first linear adhesive tape body 31 and the first U-shaped adhesive tape body 32 abut each other to form the first nonlinear gap 101, the first U-shaped adhesive tape body 32 and the second linear adhesive tape body 33 abut each other to form the second nonlinear gap 102, the second linear adhesive tape body 33 and the second U-shaped adhesive tape body 2 abut each other to form the third nonlinear gap 103, and the second U-shaped adhesive tape body 2 and the first linear adhesive tape body 31 abut each other to form the fourth nonlinear gap 104. In addition, the line connecting the first nonlinear gap 101 and the third nonlinear gap 103 and the line connecting the second nonlinear gap 102 and the fourth nonlinear gap 104 intersect at the center point O, and the first nonlinear gap 101 and the third nonlinear gap 103 are central symmetric about point O, and the second nonlinear gap 102 and the fourth nonlinear gap 104 are central symmetric about point O. Although FIG. 7 presents the number and locations on the nonlinear gaps in the light-blocking adhesive tape 1, embodiments of the present disclosure are not limited thereto. For example, one of ordinary skill in the art can determine the locations and the number of nonlinear gaps according to the area of the light-blocking adhesive tape while manufacturing the light-blocking adhesive tape.

Figure 8:
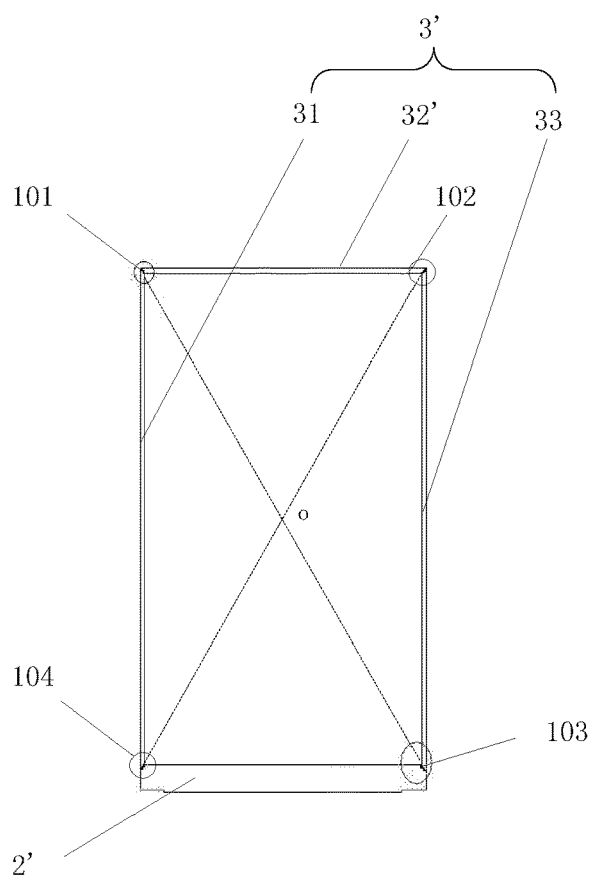
FIG. 8 is a schematic location diagram of four nonlinear gaps disposed on a corner of the adhesive tape in an embodiment of the present disclosure.

Please refer to FIG. 8, in an instance that the nonlinear gaps 100 are disposed at corners of the light-blocking adhesive tape 1, the adhesive tape 1 has a frame-like structure enclosed by four adhesive tape bodies, namely the first linear adhesive tape body 31, the third linear adhesive tape body 32', the second linear adhesive tape body 33 and the fourth linear adhesive tape body 2'. The first linear adhesive tape body 31 and the third linear adhesive tape body 32' abut each other to form the first nonlinear gap 101, the third linear adhesive tape body 32' and the second linear adhesive tape body 33 abut each other to form the second nonlinear gap 102, the second linear adhesive tape body 33 and the fourth linear adhesive tape body 2' abut each other to form the third nonlinear gap 103, and the fourth linear adhesive tape body 2' and the first linear adhesive tape body 31 abut each other to form the fourth nonlinear gap 104. In addition, the line connecting the first nonlinear gap 101 and the third nonlinear gap 103 and the line connecting the second nonlinear gap 102 and, the fourth nonlinear gap 104 intersect at the center point O, and the first nonlinear gap 101 and the third nonlinear gap 103 are central symmetric about point O, and the second nonlinear gap 102 and the fourth nonlinear gap 104 are central symmetric about point O. Although FIG. 8 presents the number and locations on the nonlinear gaps in the light-blocking adhesive tape 1, embodiments of the present disclosure are not limited thereto. For example, one of ordinary skill in the art can determine the locations and the number of nonlinear gaps according to the area of the light-blocking adhesive tape while manufacturing the light-blocking adhesive tape.

Figure 9:
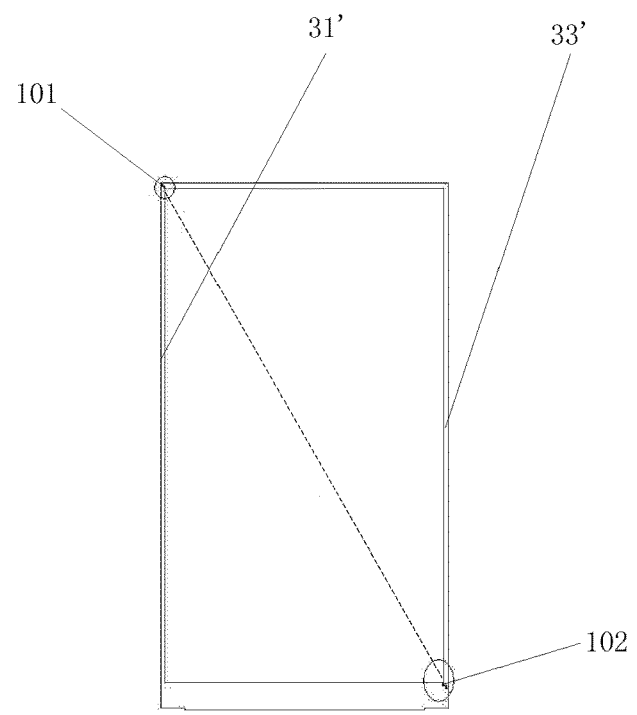
FIG. 9 is a schematic location diagram of two nonlinear gaps disposed on a corner of the adhesive tape in an embodiment of the present disclosure.

As shown in FIG. 9, in an instance that the nonlinear gaps 100 are disposed at corners of the light-blocking adhesive tape 1, the adhesive tape 1 has a frame-like structure enclosed by two nonlinear adhesive tape bodies, namely the first L-shaped adhesive tape body 31' and the second L-shaped adhesive tape body 33'. The first L-shaped adhesive tape body 31' and the second L-shaped adhesive tape body 33' form the first nonlinear gap 101 and the second nonlinear gap 102, and are disposed at diagonal positions on the frame-like structure of the adhesive tape 1.

It is noted that the plurality of nonlinear gaps 100 on the adhesive tape 1 can be disposed on sides of the adhesive tape 1 or at corners of the adhesive tape 1, or, some may be disposed on sides of the adhesive tape 1 while others may be disposed at corners of the adhesive tape 1.

In an instance that the adhesive tape body is a nonlinear structure, similar to the first U-shaped adhesive tape body 32 in FIG. 7 and the second L-shaped adhesive tape body 33' in FIG. 9, the adhesive tape body may include two connected narrow edge sections, or similar to the second U-shaped adhesive tape body 2 in FIG. 7 and the first L-shaped adhesive tape body 31' in FIG. 9, may include a wide edge section and a narrow edge section connected with the wide edge section.

In addition, in order to further avoid the increased manufacturing cost for adhesive tape 1 caused by material wasting, the adhesive tape body may also include several adhesive strips that can block light with a spacing between adjacent adhesive strips. In this way, in manufacturing the adhesive tape 1, it is possible to splicing up several adhesive strips to form the adhesive tape body, which may further utilize wastes with small aspect ratio in the adhesive tape without particularly looking for adhesive tapes with the same width as the adhesive tape body, which can reduce adhesive tape wastes. Furthermore, in an adhesive tape body, there are spacing between several adhesive strips, and upon high temperature and high humidity reliability testing of the backlight unit, these spacing can further improve the air discharge efficiency of film materials in the backlight unit and avoid deformation of the adhesive tape (with the reason similar to that of the nonlinear gaps 100).

The first L-shaped adhesive tape body 31' in the structure of the adhesive tape 1 shown in FIG. 9 will be described as an example to illustrate how to form an adhesive tape body by adhesive strips.

Figure 10:
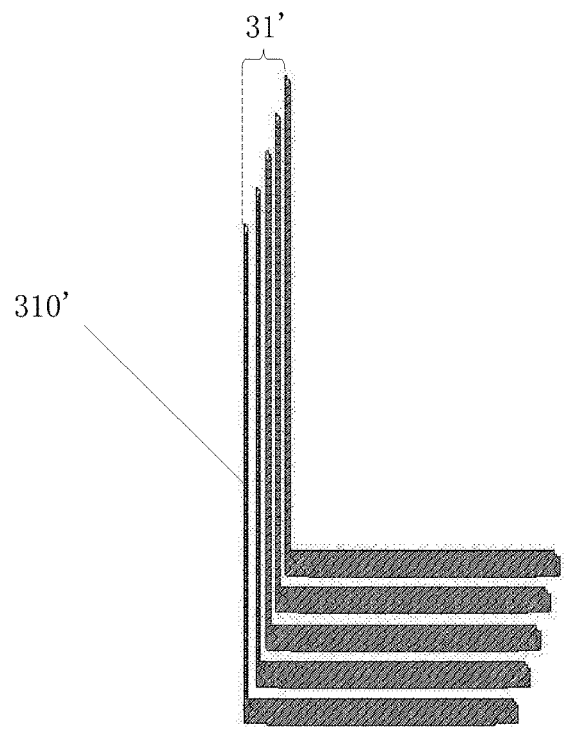
FIG. 10 is a structure diagram of an adhesive tape body in an embodiment of the present disclosure.

As shown in FIGS. 9-10, the first L-shaped adhesive tape body 31' includes several L-shaped adhesive strips 310' each of which includes a wide adhesive strip section and a narrow adhesive strip section; and the L-shaped adhesive strips may be arranged in parallel. However, embodiments of the present disclosure are not limited to what is shown in FIG. 10.

The adhesive tape provided in embodiments of the present disclosure is provided with a plurality of nonlinear gaps, and when light emitted by the backlight unit leaks outward from the gap between the backlight unit and the liquid crystal display panel, nonlinear gaps prevent light emitted by the backlight unit from leaking out from the nonlinear gaps with their characteristics of preventing rectilinear propagation of light. As can be seen, in the adhesive tape provided in embodiments of the present disclosure, although a plurality of nonlinear gaps are provided on the adhesive tape, since light emitted by the backlight unit cannot leak out from the nonlinear gaps, the adhesive tape provided in the embodiment of the present disclosure still has good light blocking performance, which can prevent light emitted by the backlight unit from leaking outward from the gap between the backlight unit and the liquid crystal display panel. Furthermore, since a plurality of nonlinear gaps separate the adhesive tape into a plurality of corresponding light-blocking adhesive tape bodies, the adhesive tape of the embodiment of the present disclosure may be manufactured by splicing, which avoids material waste due to the useless hollowed out part after the entire piece of light-blocking material is hollowed out.

In addition, the adhesive tape provided in the embodiment of the present disclosure is provided with a plurality of nonlinear gaps. During a film material in a backlight unit with this structure is subjected to high temperature and high humidity reliability testing, nonlinear gaps on the adhesive tape provide channels for air discharge from the film material in the backlight unit to allow the film material in the backlight unit to discharge air effectively. Furthermore, the plurality of nonlinear gaps separate the adhesive tape into a plurality of light-blocking adhesive tape bodies, each of which can expand or shrink accordingly as the backlight unit expands or shrinks due to temperature change without affecting other bodies, which allow a good light blocking effect of the adhesive tape.

Embodiments of the present disclosure also provide a backlight unit including the adhesive tape mentioned in above technical solutions.

The backlight unit provided in an embodiment of the present disclosure has beneficial effects same as that of the adhesive tape in the above-mentioned technical solutions, which will not be described any more herein.

Embodiments of the present disclosure also provide a display device including the backlight unit mentioned in above technical solutions.

The display device provided in an embodiment of the present disclosure has beneficial effects same as that of the backlight unit in the above-mentioned technical solution, which will not be described any more herein.

The display device provided in the above-mentioned embodiments may be any product or component with display function, such as a mobile telephone, a tablet computer, a TV set, a display, a notebook computer, a digital picture frame or a navigator.

In the description of the above-mentioned implementations, features, structures, materials or characteristics may be combined or omitted in proper manner in any one or more embodiments or examples.

The described above are only exemplary embodiments of the present disclosure, and the present disclosure is not intended to limited thereto. For one of ordinary skill in the art, various modifications and improvements may be made without departing from the spirit and scope of embodiments of the present disclosure, and all of these modifications and improvements shall fall within the scope of the present disclosure.

The present application claims the priority to and benefits of Chinese patent application No. 201620005747.0 entitled "Adhesive Tape, Backlight Unit and Display Device" filed on Jan. 4, 2016, which is incorporated herein in its entirety by reference.

What is claimed is:

1. A backlight unit comprising an adhesive tape, the adhesive tape comprising a plurality of nonlinear gaps separating the adhesive tape into a plurality of adhesive tape bodies;

wherein the nonlinear gaps are provided at corners of the adhesive tape; and each nonlinear gap comprises a section of a first adhesive tape body and a section of a second adhesive tape body;

wherein the nonlinear gap is Z-shaped, the section of the first adhesive tape body is a Z-shaped structure including a first plane, a second plane and a third plane connected in turn, the section of the second adhesive tape body is a Z-shaped structure including a fourth plane, a fifth plane and a sixth plane connected in turn;

the second adhesive tape body has a width greater than a width of the first adhesive tape body, and the sixth plane is connected with a seventh plane provided perpendicularly to the sixth plane; the first plane and the fourth plane form a first vertical spacing as a light outlet, the second plane and the fifth plane form a first horizontal spacing, the third plane and the sixth plane form a second vertical spacing, the first vertical spacing, the first horizontal spacing and the second vertical spacing are connected in turn to form a Z-shaped nonlinear gap, and the seventh plane and a side on which a long edge of the first adhesive tape body is located form a second horizontal spacing as a light inlet.

2. The backlight unit according to claim 1, wherein a contour of the adhesive tape is a frame-like contour formed by a plurality of adhesive tape bodies.

3. The backlight unit according to claim 1, wherein the adhesive tape bodies are linear adhesive tape bodies or nonlinear adhesive tape bodies; and if a shape of the adhesive tape body is nonlinear, the adhesive tape body comprises a wide edge section and a narrow edge section connected with the wide edge section, or the adhesive tape body comprises two connected narrow edge sections.

4. The backlight unit according to claim 3, wherein each of the adhesive tape bodies comprises several adhesive strips that can block light with spacing between adjacent adhesive strips.

5. The backlight unit according to claim 1, wherein the adhesive tape may be applied to a display device and match an edge contour of a backlight unit in the display device.

6. A display device, comprising a backlight unit, the backlight unit comprising an adhesive tape, wherein the adhesive tape comprises a plurality of nonlinear gaps separating the adhesive tape into a plurality of adhesive tape bodies;

wherein the nonlinear gaps are provided at corners of the adhesive tape; and each nonlinear gap comprises a section of a first adhesive tape body and a section of a second adhesive tape body;

the nonlinear gap is Z-shaped, the section of the first adhesive tape body is a Z-shaped structure including a first plane, a second plane and a third plane connected in turn, the section of the second adhesive tape body is a Z-shaped structure including a fourth plane, a fifth plane and a sixth plane connected in turn; and the second adhesive tape body has a width greater than a width of the first adhesive tape body, and the sixth plane is connected with a seventh plane provided perpendicularly to the sixth plane; the first plane and the fourth plane form a first vertical spacing as a light outlet, the second plane and the fifth plane form a first horizontal spacing, the third plane and the sixth plane form a second vertical spacing, the first vertical spacing, the first horizontal spacing and the second vertical spacing are connected in turn to form a Z-shaped nonlinear gap, and the seventh plane and a side on which a long edge of the first adhesive tape body is located form a second horizontal spacing as a light inlet.

7. The display device according to claim 6, wherein a contour of the adhesive tape is a frame-like contour formed by a plurality of adhesive tape bodies.

8. The display device according to claim 6, wherein the adhesive tape bodies are linear adhesive tape bodies or nonlinear adhesive tape bodies; and if a shape of the adhesive tape body is nonlinear, the adhesive tape body comprises a wide edge section and a narrow edge section connected with the wide edge section, or the adhesive tape body comprises two connected narrow edge sections.

9. The display device according to claim 8, wherein each of the adhesive tape bodies comprises several adhesive strips that can block light with spacing between adjacent adhesive strips.

10. The display device according to claim 6, wherein the adhesive tape may be applied to a display device and match an edge contour of a backlight unit in the display device.

11. An adhesive tape, comprising a plurality of nonlinear gaps separating the adhesive tape into a plurality of adhesive tape bodies;

wherein the nonlinear gaps are provided at corners of the adhesive tape; and each nonlinear gap comprises a section of a first adhesive tape body and a section of a second adhesive tape body;

the nonlinear gap is Z-shaped, the section of the first adhesive tape body is a Z-shaped structure including a first plane, a second plane and a third plane connected in turn, the section of the second adhesive tape body is a Z-shaped structure including a fourth plane, a fifth plane and a sixth plane connected in turn; and corners of the adhesive tape, the second adhesive tape body has a width greater than a width of the first adhesive tape body, and the sixth plane is connected with a seventh plane provided perpendicularly to the sixth plane; the first plane and the fourth plane form a first vertical spacing as a light outlet, the second plane and the fifth plane form a first horizontal spacing, the third plane and the sixth plane form a second vertical spacing, the first vertical spacing, the first horizontal spacing and the second vertical spacing are connected in turn to form a Z-shaped nonlinear gap, and the seventh plane and a side on which a long edge of the first adhesive tape body is located form a second horizontal spacing as a light inlet.

12. The adhesive tape according to claim 11, wherein a contour of the adhesive tape is a frame-like contour formed by a plurality of adhesive tape bodies.

13. The adhesive tape according to claim 11, wherein the adhesive tape bodies are linear adhesive tape bodies or nonlinear adhesive tape bodies; and if a shape of the adhesive tape body is nonlinear, the adhesive tape body comprises a wide edge section and a narrow edge section connected with the wide edge section, or the adhesive tape body comprises two connected narrow edge sections.

14. The adhesive tape according to claim 13, wherein each of the adhesive tape bodies comprises several adhesive strips that can block light with spacing between adjacent adhesive strips.

15. The adhesive tape according to claim 11, wherein the adhesive tape may be applied to a display device and match an edge contour of a backlight unit in the display device.

* * * * *